United States Patent Office 3,230,224
Patented Jan. 18, 1966

3,230,224
SUBSTITUTED N-CYANO MORPHINANS
Yoshiro Sawa, Hyogo Prefecture, and Naoki Tsuzi and Haruhiko Tada, Osaka Prefecture, Japan, assignors to Shionogi & Co., Ltd., Osaka, Japan
No Drawing. Filed Apr. 3, 1963, Ser. No. 270,187
Claims priority, application Japan, Apr. 6, 1962, 37/14,062
1 Claim. (Cl. 260—285)

The present invention relates to morphinan derivatives and method of producing them.

In the term "morphinan" herein employed, there are included all the compounds having a fundamental structure representable by the following plane formula:

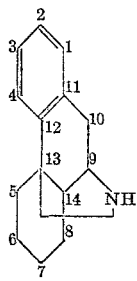

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a - hexahydro - 2H - 10,4a - iminoethanophenanthrene), inclusively. When distinction is necessary, normal morphinan and isomorphinan will be hereinafter designated as "morphinan (cis)" and "morphinan (trans)," respectively. Still, the position-numbering hereinafter employed for the morphinan derivatives is that generally accepted in morphinan chemistry as shown in the above plane formula.

The objective morphinan derivative in the present invention is representable by the following plane formula:

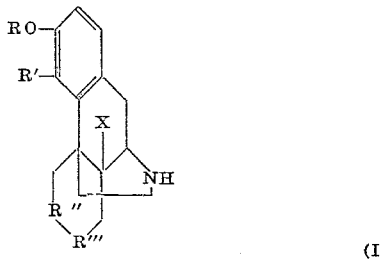

wherein R represents a lower alkyl group (e.g. methyl, ethyl, propyl), R' represents a hydrogen atom, an aryloxy group (e.g. phenyloxy, naphthyloxy) or a substituted aryloxy group (e.g. substituted phenyloxy, substituted naphthyloxy) wherein the substituent is lower alkyl (e.g. methyl, ethyl, propyl), lower alkoxy (e.g., methoxy, ethoxy, propoxy), nitro or amino, R" and R''' each represents a methylene group, a hydroxymethylene group, an acylated hydroxymethylene group (e.g. acetyloxymethylene, propionyloxymethylene), a carbonyl group or a ketalated carbonyl group (e.g. ethylenedioxymethylene, diethoxymethylene) and X represents a hydrogen atom, a hydroxyl group or an acylated hydroxyl group (e.g. acetyloxy, propionyloxy, butyryloxy) and shows pharmacological activities such as antitussive activity and antiinflammatory activity.

Accordingly, a basic object of the present invention is to embody the morphinan derivative of Formula I. Another object of the invention is to embody the pharmacologically active morphinan (I). A further object of the invention is to embody a process for preparing the morphinan (I). These and other objects will be apparent to those conversant with the art to which the present invention pertains from the subsequent description.

The process of the present invention is illustratively represented by the following scheme:

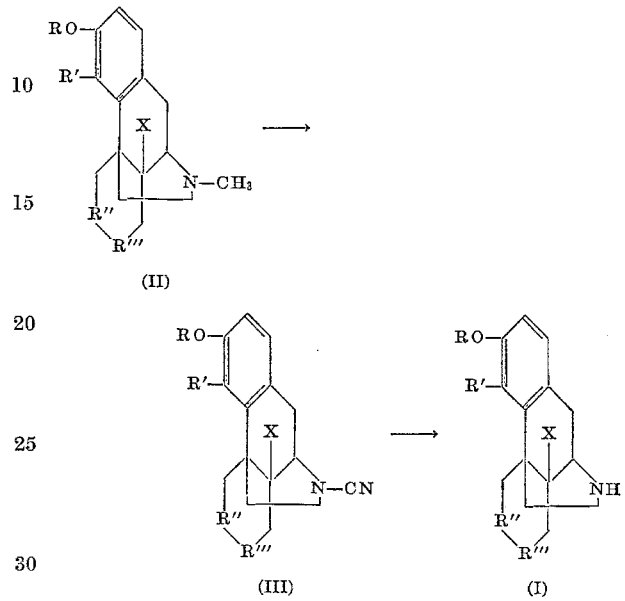

wherein R, R', R", R''' and X each has the same significance as designated above.

As the starting material, there may be used the optically active or racemic N-methylmorphinan of Formula II.

According to the process of the present invention, the starting N-methylmorphinan (II) is subjected to substitution of the methyl group at the N-position with a cyano group, followed by elimination of the cyano group in the resultant N-cyanomorphinan (III) to give the objective morphinan (I). The substitution is accomplished by treating the N-methylmorphinan (II) with cyanogen halide (e.g. cyanogen chloride, cyanogen bromide) in no or an inert organic solvent (e.g. dichloromethane, chloroform, bromoform, carbon tetrachloride). The reaction can proceed at room temperature (15 to 30° C.), but heating so as to reflux is usually preferred. The subsequent elimination is effected by treating the thus-produced N-cyanomorphinan (III) with an acid (e.g. hydrochloric acid, hydrobromic acid, sulfuric acid, nitric acid) or an alkali (e.g. potassium hydroxide, sodium hydroxide, calcium hydroxide), preferably a volatile mineral acid such as hydrochloric acid, in an aqueous medium usually while heating with reflux. In the elimination reaction, if any, such the group as the 6,6-ethylenedioxy group, the 7-acetyloxy group and the 14-acetyloxy group may be simultaneously decomposed. However, the intended elimination of the cyano group at the N-position is not blocked by the said simultaneous decomposition.

The objective morphinan (I) occurs in optically active form as well as in racemic mixture and these are all within the scope of the present invention.

The morphinan (I) forms acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The thus-produced morphinan (I) and acid addition salts thereof exhibit various pharmacological activities such as antitussive activity and antiinflammatory activity.

For instance, (—)-3-methoxymorphinan (cis) hydrobromide showed antitussive activity at the $ED_{50}$ (effective dose) value of 70.50 milligrams per kilogram of body weight in the animal test using guinea pigs according to a conventional method [Winter et al.: J. Exper. Med., vol 101, p. 17 (1955)]. The same compound also produced inhibition of the edema caused by formalin at the inhibitory ratio of 16.5 percent, when administered subcutaneously to rats at the dose of 50 milligrams per kilogram of body weight. Other products of the present invention show similar activities. Accordingly, they are useful as antitussive and/or antiinflammatory agents.

Practical and presently preferred embodiments of the present invention are illustrated by the following examples. In the examples, abbreviations each have conventional meanings, e.g. mg.=milligram(s), g.=gram(s), ml.=millilitre(s), ° C.=degrees centigrade.

EXAMPLE 1

*Preparation of (+)-3-methoxy-4-phenyloxymorphinan (cis)*

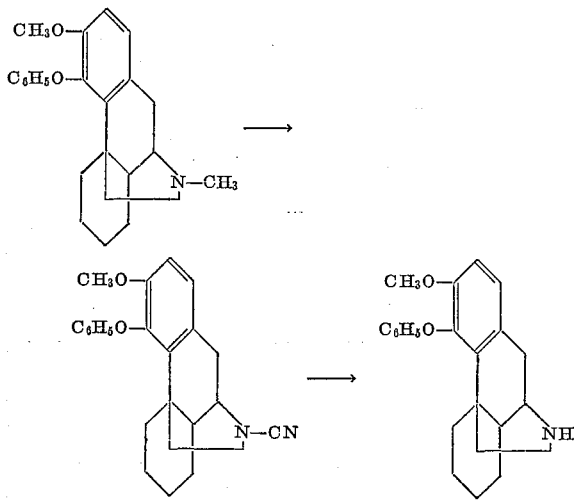

To a solution of (+)-3-methoxy-4-phenyloxy-N-methylmorphinan (cis) (5.0 g.) in chloroform (35 ml.), there is added dropwise a suspension of cyanogen bromide (1.6 g.) in chloroform (15 ml.) for 20 minutes, and the resulting mixture is refluxed for 2 hours. The solvent is evaporated from the reaction mixture under reduced pressure. The residue is shaken with ether. The ether extract is washed with water, dilute hydrochloric acid and aqueous sodium hydroxide in order, dried and evaporated to give (+)-3-methoxy-4-phenyloxy-N-cyanomorphinan (cis) (3.63 g.) as an oil.

A solution of (+)-3-methoxy-4-phenyloxy-N-cyanomorphinan (cis) (2.25 g.) prepared above in 15% hydrochloric acid (50 ml.) is refluxed for 10 hours. The reaction mixture is made to alkalinity with sodium hydroxide and shake with ether. The ether extract is chromatographed on alumina to eliminate impurities. The resulting ether solution is evaporated to give (+)-3-methoxy-4-phenyloxymorphinan (cis) (1.73 g.) as an oil. The oil is treated with hydrochloric acid and crystallized from water to give (+)-3-methoxy-4-phenyloxymorphinan (cis) hydrochloride as crystals melting at 204 to 206° C. The said oil is also treated with hydrobromic acid and crystallized from water to give (+)-3-methoxy-4-phenyloxymorphinan (cis) hydromide as crystals gradually melting from 105° C. $[\alpha]_D^{29}$ —0.5° ±2° (methanol).

*Analysis.*—Calcd. for $C_{23}H_{27}O_2N.HBr.\frac{3}{2}H_2O$: C, 60.39; H, 6.83; N, 3.06; Br, 17.47. Found: C, 60.16; H, 6.89; N, 3.04; Br, 16.90.

The starting material of this example (+)-3-methoxy-4-phenyloxy - N - methylmorphinan (cis), is a known compound [Sawa et al.: Tetrahedron, vol. 15, p. 144 (1961)].

EXAMPLE 2

*Preparation of (+)-3-methoxymorphinan (cis)*

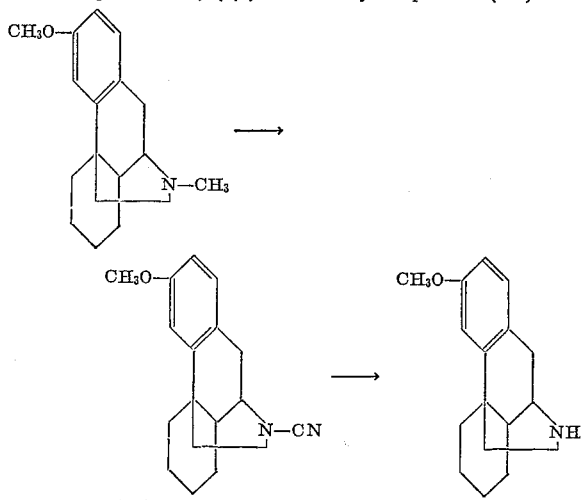

To a solution of (+)-3-methoxy-N-methylmorphinan (cis) (20 g.) in chloroform (80 ml.), there is added dropwise a suspension of cyanogen bromide (9.4 g.) in chloroform (80 ml.) while about 20 minutes. The resultant mixture is refluxed for 2 hours and then the solvent evaporated. The residue is dissolved in benzene, washed with water and dilute hydrochloric acid in order and evaporated to dryness. The resultant product (14.6 g.) is treated with ether and crystallized from ethanol to give (+)-3-methoxy-N-cyanomorphinan (cis) as crystals melting at 90 to 93.5° C. $[\alpha]_D^{25}$ + 142.9° (ethanol).

*Analysis.*—Calcd. for $C_{18}H_{22}ON_2$: C, 76.56; H, 7.85; N, 9.92. Found: C, 76.30; H, 7.96; N, 9.96.

A solution of (+)-3-methoxy-N-cyanomorphinan (cis) (9.2 g.) prepared above in 10% hydrochloric acid (200 ml.) is refluxed for 6.5 hours. The reaction mixture is made to alkalinity with sodium hydroxide and shaken with benzene. The benzene extract is evaporated to give (+)-3-methoxymorphinan (cis) (7.0 g.) as an oil. The oil is treated with hydrochloric acid and crystallized from dilute hydrochloric acid to give (+)-3-methoxymorphinan (cis) hydrochloride as crystals melting at 260 to 262° C. $[\alpha]_D^{28}$ +23.2° (water).

*Analysis.*—Calcd. for $C_{17}H_{23}ON.HCl$: C, 69.47; H, 8.23; N, 4.77; Cl, 12.01. Found: C, 68.35; H, 8.31; N, 5.13; Cl, 12.22.

The starting material of this example (+)-3-methoxy-N-methylmorphinan (cis), is a known compound [Sawa et al.: Tetrahedron, vol. 15, p. 144 (1961)].

EXAMPLE 3

*Preparation of (—)-3-methoxymorphinan (cis)*

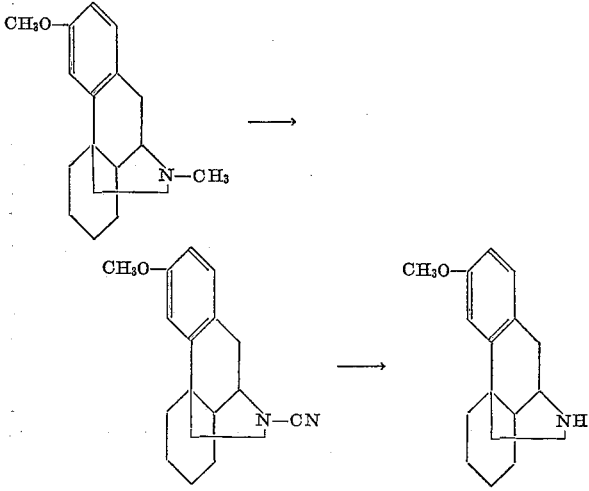

To a solution of (—)-3-methoxy-N-methylmorphinan (cis) (19.0 g.) in chloroform (80 ml.), there is added dropwise a suspension of cyanogen bromide (11.1 g.) in chloroform (80 ml.) while 20 minutes, and the resultant mixture is refluxed for 2 hours. The reaction mixture is evaporated under reduced pressure. The residue is dissolved in benzene. The benzene solution is washed with water, hydrochloric acid and aqueous sodium hydroxide in order, dried and evaporated. The resulting product (13.4 g.) is treated with ether and crystallized from ethanol to give (—)-3-methoxy-N-cyanomorphinan (cis) as crystals melting at 93 to 94° C. $[\alpha]_D^{18}$ —142.3° (methanol).

*Analysis.*—Calcd. for $C_{18}H_{22}ON_2$: C, 76.56; H, 7.85; N, 9.92. Found: C, 76.26; H, 7.93; N, 10.15.

A solution of (—)-3-methoxy-N-cyanomorphinan (cis) (12.2 g.) prepared above in 10% hydrochloric acid (250 ml.) is refluxed for 12 hours. The resultant mixture is made to alkalinity with aqueous sodium hydroxide and shaken with benzene. The benzene extract is chromatographed on alumina to eliminate impurities. The resulting benzene solution is evaporated to give (—)-3-methoxymorphinan (cis) (10.3 g.) as an oil. The oil is treated with hydrobromic acid and crystallized from water to give (—)-3-methoxymorphinan (cis) hydrobromide as crystals melting at 282° C. $[\alpha]_D^{19}$ —19.8° (methanol).

*Analysis.*—Calcd. for $C_{17}H_{23}ON \cdot HBr$: C, 60.35; H, 7.15; N, 4.14; Br, 23.62. Found: C, 60.21; H, 7.22; N, 4.15; Br, 24.17.

The starting material of this example (—)-3-methoxy-N-methylmorphinan (cis), is a known compound [Sawa et al.: Tetrahedron, vol. 15, p. 154 (1961)].

EXAMPLE 4

*Preparation of (—)-3-methoxy-6-oxo-14-hydroxymorphinan (cis)*

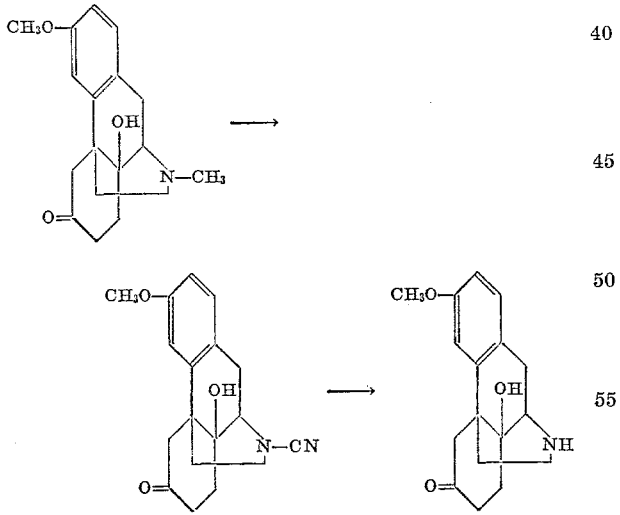

To a solution of (—)-3-methoxy-6-oxo-14-hydroxy-N-methylmorphinan (cis) (6 g.) in chloroform (40 ml.), there is added a suspension of cyanogen bromide (4 g.) in chloroform (40 ml.), and the resultant mixture is refluxed for 2 hours on a water bath. The reaction mixture is evaporated and the residue dissolved in chloroform. The chloroform solution is washed with N hydrochloric acid to remove the contaminating base and then evaporated. Recrystallization of the residue (2.8 g.) from ethanol gives (—)-3-methoxy-6-oxo-14-hydroxy-N-cyanomorphinan (cis) (1.7 g.) as prisms melting at 209 to 210° C. The mother liquor is evaporated and crystallized from ethyl acetate to give the additional crystals (0.4 g.) of the same compound. Total yield, 2.05 g. $[\alpha]_D^{25}$ —198° (chloroform).

*Analysis.*—Calcd. for $C_{18}H_{20}O_3N_2$: C, 69.21; H, 6.45; N, 8.97. Found: C, 68.87; H, 6.65; N, 8.78.

A solution of (—)-3-methoxy-6-oxo-14-hydroxy-N-cyanomorphinan (cis) (1.6 g.) prepared in 2 N hydrochloric acid (30 ml.) is refluxed for 10 minutes. After cooling, the reaction mixture is neutralized with aqueous sodium carbonate, saturated with sodium chloride and shaken with dichloromethane. The dichloromethane extract is evaporated to give crude (—)-3-methoxy-6-oxo-14-hydroxymorphinan (cis) (1.4 g.), which is treated with tartaric acid and crystallized from 95% ethanol to give (—)-3-methoxy-6-oxo-14-hydroxymorphinan (cis) tartrate as leaflets melting at 211 to 212° C. (decomp.). $[\alpha]_D^{21}$ —31° (chloroform).

*Analysis.*—Calcd. for $C_{17}H_{21}O_3N \cdot C_4H_6O_6$: C, 57.66; H, 6.22; N, 3.20. Found: C, 57.54; H, 6.41; N, 3.19.

The starting material of this example (—)-3-methoxy-6-oxo-14-hydroxy-N-methylmorphinan (cis), is prepared from the baine according to the following scheme:

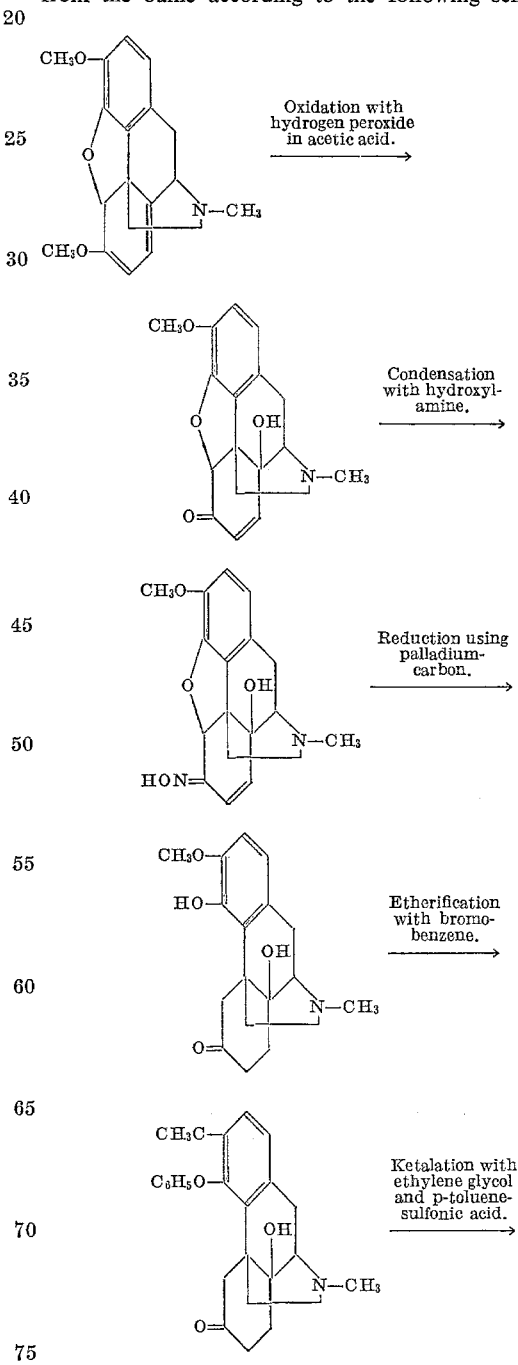

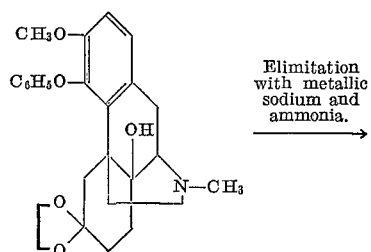

Elimination with metallic sodium and ammonia. →

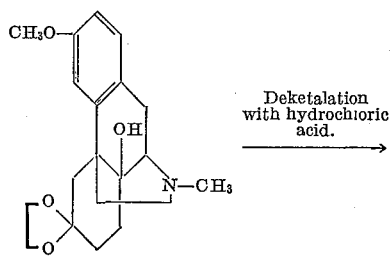

Deketalation with hydrochloric acid. →

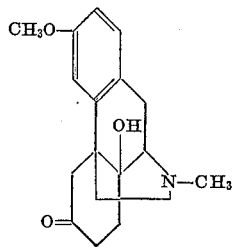

EXAMPLE 5

Preparation of (—)-3-methoxy-6-oxo-14-hydroxymorphinan (cis)

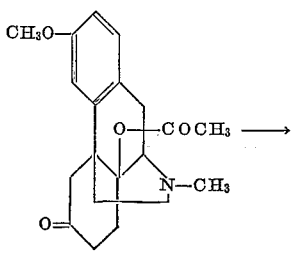

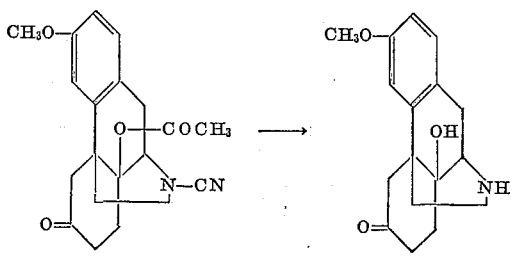

A mixture of (—)-3-methoxy-6-oxo-14-acetyloxy-N-methylmorphinan (cis) (1 g.) and cyanogen bromide (2 g.) is heated in a sealed tube on a steam bath for 5 minutes. After cooling, the reaction mixture is dissolved in chloroform and the solvent evaporated. The residue is dissolved again in chloroform, washed with N hydrochloric acid and evaporated. The residue is crystallized from ethanol to give (—)-3-methoxy-6-oxo-14-acetyloxy-N-cyanomorphinan (cis) (690 mg.) as crystals melting at 263 to 264° C. (decomp.). $[\alpha]_D^{25}$ —176° (chloroform).

Analysis.—Calcd. for $C_{20}H_{22}O_4N_2$: C, 67.78; H, 6.26; N, 7.91. Found: C, 67.67; H, 6.48; N, 8.10.

A solution of (—)-3-methoxy-6-oxo-14-acetyloxy-N-cyanomorphinan (cis) (1.2 g.) prepared above in 25% sulfuric acid (15 ml.) is refluxed for 6 hours. After cooling, the reaction mixture is neutralized with ammonia-water, saturated with sodium chloride, made to alkalinity with ammonia and shaken with dichloromethane. The dichloromethane extract is shaken with N hydrochloric acid. The hydrochloric acid layer is made to alkalinity with ammonia, saturated with sodium chloride and shaken with dichloromethane. Removal of the solvent from the dichloromethane extract gives (—)-3-methoxy-6-oxo-14-hydroxymorphinan (cis) (300 mg.) as a hygroscopic substance. The dichloromethane layer separated from the said hydrochloric acid layer is evaporated to give (—)-3-methoxy-6-oxo-14-hydroxy-N-acetylmorphinan (cis) (870 mg.) as crystals melting at 196 to 197° C.

The starting material of this example (—)-methoxy-6-oxo-14-acetyloxy-N-methylmorphinan (cis), is prepared by subjecting (—)-3-methoxy-6-oxo-14-hydroxy-N-methylmorphinan (cis) [cf. Example 4 or this specification] to acetylation in a per se conventional manner.

EXAMPLE 6

Preparation of (—)-3-methoxy-6-oxo-14-hydroxymorphinan (cis)

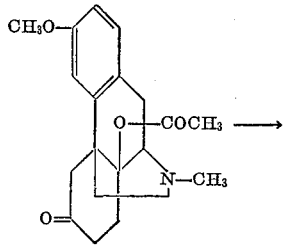

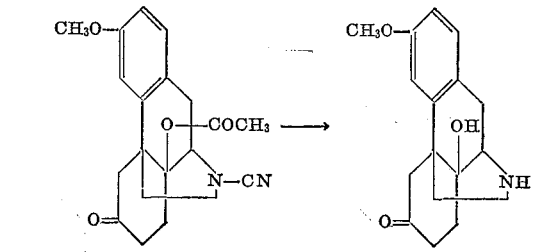

To a solution of (—)-3-methoxy-6-oxo-14-acetyloxy-N-methylmorphinan (cis) (3 g.) in chloroform (15 ml.), there is added a suspension of cyanogen bromide (3 g.) in chloroform (15 ml.), and the resultant mixture is refluxed for 2 hours. Treating the reaction mixture as in Example 5, there is obtained crude (—)-3-methoxy-6-oxo-14-acetyloxy-N-cyanomorphinan (cis) (3 g.), which is crystallized from ethanol to give pure crystals melting at 263 to 264° C.

A solution of (—)-3-methoxy-6-oxo-14-acetyloxy-N-cyanomorphinan (cis) (0.5 g.) prepared above in a mixture of sodium hydroxide (0.4 g.), water (5 ml.) and methanol (5 ml.) is refluxed for 2.5 hours. After evaporation of methanol from the reaction mixture, there is added water and neutralized with 6 N hydrochloric acid. The resulting mixture is shaken with dichloromethane. The dichloromethane layer is evaporated to give (—)-3-methoxy-6-oxo-14-hydroxy-N-acetylmorphinan (cis) (320 mg.). The hydrochloric acid layer is saturated with sodium chloride, made to alkalinity with ammonia and shaken with dichloromethane. The dichloromethane extract is evaporated to give (—)-3-methoxy-6-oxo-14-hydroxymorphinan (cis) (180 mg.).

What is claimed is:

(−)-3-methoxy-6-oxo-14-acetyloxy-N-cyanomorphinan (cis).

References Cited by the Examiner

UNITED STATES PATENTS

| | | | |
|---|---|---|---|
| 2,885,401 | 5/1959 | Grussner et al. | 260—285 |
| 2,890,221 | 6/1959 | Rapoport et al. | 260—285 |
| 3,085,091 | 4/1963 | Sawa et al. | 260—285 |

OTHER REFERENCES

Hartung: Ind. and Eng. Chem., vol. 37, pages 126–127 (1945).

Schnider et al.: Helv. Chim. Acta, vol. 34, pp. 2211–17 (1951).

NICHOLAS S. RIZZO, *Primary Examiner.*